United States Patent [19]

Breitenfellner et al.

[11] 4,456,723

[45] Jun. 26, 1984

[54] THERMOPLASTIC MOULDING COMPOSITION AND THE USE THEREOF

[75] Inventors: Franz Breitenfellner, Bensheim; Thomas Kainmüller, Lindenfels, both of Fed. Rep. of Germany

[73] Assignee: Ciba-Geigy Corporation, Ardsley, N.Y.

[21] Appl. No.: 435,831

[22] Filed: Oct. 21, 1982

[30] Foreign Application Priority Data

Oct. 28, 1981 [CH] Switzerland .......................... 6879/81

[51] Int. Cl.$^3$ .............................................. C08K 3/26
[52] U.S. Cl. .................................. 524/415; 524/417; 524/605
[58] Field of Search ............... 524/415, 417, 706, 605; 523/506

[56] References Cited

U.S. PATENT DOCUMENTS

| | | | |
|---|---|---|---|
| 3,980,611 | 9/1976 | Anderson et al. .................. | 524/417 |
| 4,000,109 | 12/1976 | Smith et al. .......................... | 524/405 |
| 4,043,971 | 8/1977 | Wurmb et al. ....................... | 524/423 |
| 4,052,356 | 10/1977 | Breitenfellner et al. ............. | 524/447 |
| 4,212,793 | 7/1980 | Shue ..................................... | 524/417 |
| 4,346,028 | 8/1982 | Griffith ................................. | 524/417 |
| 4,366,279 | 12/1982 | Tomioka et al. .................... | 524/417 |

FOREIGN PATENT DOCUMENTS

| | | | |
|---|---|---|---|
| 1179155 | 1/1970 | United Kingdom ................ | 524/415 |
| 2057454 | 4/1981 | United Kingdom . | |

Primary Examiner—Lewis T. Jacobs
Attorney, Agent, or Firm—Luther A. R. Hall

[57] ABSTRACT

Moulding compositions based on thermoplastic polymers, which compositions optionally contain fillers, reinforcing fillers and/or fire-retarding agents, have improved tracking resistance, and, in the case where a noninflammable finish has been imparted, they reduce both the corrosiveness on contact metals and the dripping tendency.

9 Claims, No Drawings

THERMOPLASTIC MOULDING COMPOSITION AND THE USE THEREOF

The present invention relates to a moulding composition based on a thermoplastic polymer, which composition contains a substantially water-free calcium phosphate and optionally, for example, fillers, reinforcing fillers and/or fire-retarding agents, and to the use of the moulding composition for producing shaped objects.

Thermoplastic polymers are valuable moulding compounds which have a wide field of application in industry. In order that the polymers fulfil the purpose for which they are to be applied, it is customary to add to them fillers with which specific mechanical and electrical properties can be improved.

Reinforcing fillers, for example glass fibres, can be added to increase the dimensional stability under heat and the rigidity; and fire-retarding agents are incorporated to reduce combustibility. As a result of these additives, however, the tracking resistance is decreased, an important property when the products produced are to be used in the electrical field. A further problem in this connection is corrosiveness on contact metals of the gases issueing from the moulded articles at elevated application temperatures.

Fillers for improving tracking resistance are already known, for example kaolin (German Offenlegungsschrift No. 2,616,754), calcium or barium sulfate (German Offenlegungsschrift No. 2,524,121) and metal borates (German Offenlegungsschrift No. 2,534,762).

The object of the present invention is to provide nonreinforced, reinforced and/or noninflammable-rendered thermoplastic moulding compositions having an improved tracking resistance; and in the case of polymers rendered noninflammable, a reduction of corrosiveness on contact metals is to be achieved.

The present invention relates therefore to a moulding composition based on a thermoplastic polymer, which composition contains an effective amount of a substantially water-free calcium phosphate, and optionally customary additives.

Thermoplasts and duroplasts suitable for the moulding composition according to the invention are for example:

1. Polymers which are derived from hydrocarbons with single or double unsaturation, such as polyolefins, for example polyethylene which can be optionally crosslinked, polypropylene, polyisobutylene, polymethylbutene-1, polymethylpentene-1, polybutene-1, polyisoprene, polybutadiene, polystyrene, polyisobutylene, copolymers of the monomers on which the homopolymers mentioned are based, such as ethylene-propylene copolymers, propylene-butene-1 copolymers, propylene-isobutylene copolymers, and also terpolymers of ethylene and propylene with a diene, such as hexadiene, dicyclopentadiene or ethylidenenorbornenes; mixtures of the above-mentioned homopolymers, such as mixtures of polypropylene and polyethylene, polypropylene and polybutene-1, or polypropylene and polyisobutylene.

2. Halogen-containing vinyl polymers, such as polyvinyl chloride, polyvinylidene chloride, polyvinyl fluoride, polychloroprene and chlorinated rubbers.

3. Polymers derived from $\alpha,\beta$-unsaturated acids and their derivatives, such as polyacrylates and polymethacrylates, polyacrylamides and polyacrylonitrile, as well as copolymers with other vinyl compounds, such as acrylonitrile/butadiene/styrene, acrylonitrile/styrene and acrylonitrile/styrene/acrylic ester copolymers.

4. Polymers derived from unsaturated alcohols and amines or their acyl derivatives or acetals, such as polyvinyl alcohol, polyvinyl-acetate, -stearate, -benzoate or -maleate, polyvinyl butyral, polyallyl phthalate, polyallyl melamine, and copolymers thereof with other vinyl compounds, such as ethylene/vinyl acetate copolymers.

5. Homo- and copolymers derived from epoxides, such as polyethylene oxide, or the polymers which are derived from polyglycidyl compounds.

6. Polyacetals, such as polyoxymethylene and polyoxyethylene, as well as those polyoxymethylenes which contain ethylene oxide as the comonomer.

7. Polyphenylene oxides.

8. Polyurethanes and polyureas.

9. Polycarbonates.

10. Polysulfones.

11. Polyamides and copolyamides derived from diamines and dicarboxylic acids, and/or from aminocarboxylic acids or from the corresponding lactams, such as polyamide 6, polyamide 6/6, polyamide 6/10, polyamide 11 and polyamide 12, form a preferred group of plastics.

12. Cross-linked polymers which are derived from aldehydes on the one hand, and from phenols, ureas and melamines on the other hand, such as phenol-formaldehyde resins, urea-formaldehyde resins and melamine-formaldehyde resins.

13. Alkyd resins, such as glycerin-phthalic acid resins and mixtures thereof with melamine-formaldehyde resins.

14. Unsaturated polyester resins derived from copolyesters of saturated and unsaturated dicarboxylic acids with polyhydric alcohols, as well as vinyl compounds, as crosslinking agents.

15. Natural polymers, such as cellulose and rubber, as well as their polymer-homologously chemically modified derivatives, such as cellulose acetates, cellulose propionates and cellulose butyrates, or cellulose ethers, such as methylcellulose.

16. Thermoplastic polyesters, and also mixtures of the aforementioned polymers.

Preferred thermoplasts are in particular polyesters. Suitable straight-chain polyesters are preferably crystalline or partially crystalline, and have in this case especially melting points of at least 150° C. They can however also be in an amorphous form, the polyester then preferably having a glass transition temperature of at least 70° C., particularly at least 100° C. The intrinsic viscosity of the polyesters is preferably at least 0.6 dl/g, in particular at least 0.8 dl/g.

The polyesters can be homo- or copolymers, which are formed from aliphatic, cycloaliphatic or aromatic dicarboxylic acids and diols or hydroxycarboxylic acids. Mixtures of these polyesters are also suitable. The composition thereof depends essentially on the properties required for a specific purpose.

The aliphatic dicarboxylic acids can contain 2 to 40 C atoms, the cycloaliphatic dicarboxylic acids 6 to 10 C atoms, the aromatic dicarboxylic acids 8 to 14 C atoms, the aliphatic hydroxycarboxylic acids 2 to 12 C atoms, and the aromatic as well as cycloaliphatic hydroxycarboxylic acids 7 to 14 C atoms.

The aliphatic diols can contain 2 to 12 C atoms, the cycloaliphatic diols 5 to 8 C atoms, and the aromatic diols 6 to 16 C atoms. Diols designated as aromatic diols are those in which two hydroxyl groups are bonded to one or to different aromatic hydrocarbon radicals.

It is also possible for the polyesters to be branched with small amounts, for example 0.1 to 3 mol %, relative to the dicarboxylic acids present, of monomers that are more than bifunctional (for example pentaerythritol or trimellitic acid).

In the case of polyesters formed from at least 3 monomers, these can be statistically distributed, or the polyesters can be block polymers.

Suitable dicarboxylic acids are straight-chain and branched-chain, saturated aliphatic dicarboxylic acids, aromatic dicarboxylic acids and cycloaliphatic dicarboxylic acids.

Aliphatic dicarboxylic acids which are suitable are those having 2 to 40 C atoms, for example: oxalic acid, malonic acid, dimethylmalonic acid, succinic acid, octadecylsuccinic acid, pimelic acid, adipic acid, trimethyladipic acid, sebacic acid, azelaic acid and dimeric acids (dimerisation products of unsaturated aliphatic carboxylic acids, such as oleic acid) or alkylated malonic and succinic acids, such as octadecylsuccinic acid.

Suitable cycloaliphatic dicarboxylic acids are: 1,3-cyclobutanedicarboxylic acid, 1,3-cyclopentane-dicarboxylic acid, 1,3- and 1,4-cyclohexanedicarboxylic acid, 1,3- and 1,4-dicarboxylmethylcyclohexane and 4,4'-dicyclohexyldicarboxylic acid.

And suitable aromatic dicarboxylic acids are in particular: terephthalic acid, isophthalic acid, o-phthalic acid, as well as 1,3-, 1,4-, 2,6- or 2,7-naphthalenedicarboxylic acid, 4,4'-diphenyldicarboxylic acid, 4,4'-diphenylsulfone carboxylic acid, 1,1,3-trimethyl-5-carboxyl-3-(p-carboxylphenyl)-indane, 4,4'-diphenyl ether dicarboxylic acid and bis-p-(carboxylphenyl)-methane.

The aromatic dicarboxylic acids are preferred, among them especially terephthalic acid, isophthalic acid and orthophthalic acid.

Further suitable dicarboxylic acids are those containing —CO—NH— groups: they are described in the German Offenlegungsschrift No. 2,414,349. Also suitable are dicarboxylic acids containing N-heterocyclic rings, for example those which are derived from carboxyl-alkylated, carboxyl-phenylated or carboxyl-benzylated monoamino-s-triazinedicarboxylic acids (cp. German Offenlegungsschriften Nos. 2,121,184 and 2,533,675), mono- or bis-hydantoins, optionally halogenated benzimidazolones, or parabanic acid. The carboxylalkyl group in these cases can contain 3 to 20 C atoms.

Suitable aliphatic diols are the straight-chain and branched-chain aliphatic glycols, particularly those having 2 to 12 C atoms, especially 2 to 6 C atoms, in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol or 1,12-dodecanediol. A suitable cycloaliphatic diol is, for example, 1,4-dihydroxycyclohexane. Further suitable aliphatic diols are for example: 1,4-dihydroxymethylcyclohexane, aromatic-aliphatic diols, such as p-xylylene glycol or 2,5-dichloro-p-xylylene glycol, 2,2-(β-hydroxyethoxyphenyl)-propane, and also polyoxaalkylene glycol, such as diethylene glycol, triethylene glycol or polyethylene glycol. The alkylenediols are preferably straight-chain, and contain in particular 2 to 4 carbon atoms.

Preferred diols are the alkylenediols, 1,4-dihydroxycyclohexane and 1,4-dihydroxymethylcyclohexane. Ethylene glycol and 1,4-butanediol are especially preferred.

Further suitable aliphatic diols are the β-hydroxylalkylated, especially β-hydroxyl-ethylated bisphenols, such as 2,2-bis-[4'-(β-hydroxyethoxy)-phenyl]-propane. Further bisphenols are mentioned later.

A further group of suitable aliphatic diols are the heterocyclic diols described in the German Offenlegungsschriften Nos. 1,812,003, 2,342,432, 2,342,372 and 2,453,326. Examples are: N,N'-bis-(β-hydroxyethyl-5,5-dimethyl)-hydantoin, N,N'-bis-(βhydroxypropyl-5,5-dimethyl)-hydantoin, methylene-bis-[N,N'-(β-hydroxyethyl)-5-methyl-5-ethylhydantoin], methylene-bis-[N-(β-hydroxyethyl)-5,5-dimethylhydantoin], N,N'-bis-(β-hydroxyethyl)-benzimidazolone, -(tetrachloro)-benzimidazolone or -(tetrabromo)-benzimidazolone.

Suitable aromatic diols are mononuclear diphenols and particularly binuclear, which carry on each aromatic nucleus a hydroxyl group. By aromatic are meant preferably hydrocarbon-aromatic radicals, for example phenylene or naphthylene. To be mentioned besides, for example, hydroquinone are in particular the bisphenols which can be represented by the following formula

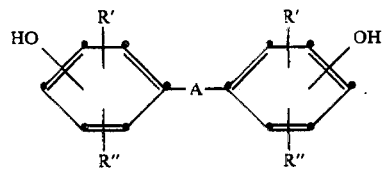

The hydroxyl groups can be in the m-position, but especially in the p-position; R' and R" in this formula can be alkyl having 1 to 6 C atoms, halogen, such as chlorine or bromine, and particularly hydrogen atoms. A can be a direct bond, or O, S, SO₂, unsubstituted or substituted alkylidene, cycloalkylidene or alkylene.

Examples of unsubstituted or substituted alkylidene are: ethylidene, 1,1- or 2,2-propylidene, 2,2-butylidene, 1,1-isobutylidene, pentylidene, hexylidene, heptylidene, octylidene, dichloroethylidene and trichloroethylidene.

Examples of unsubstituted or substituted alkylene are: methylene, ethylene, phenylmethylene, diphenylmethylene and methylphenylmethylene. Examples of cycloalkylidene are cyclopentylidene, cyclohexylidene, cycloheptylidene and cyclooctylidene.

Examples of bisphenols are: bis-(p-hydroxyphenyl)-ether or -thioether, bis-(p-hydroxyphenyl)-sulfone, bis-(p-hydroxyphenyl)-methane, 1,2-bis-(p-hydroxyphenyl)-ethane, 1-phenyl-bis-(p-hydroxyphenyl)-methane, diphenyl-bis-(p-hydroxyphenyl)-methane, diphenyl-bis-(p-hydroxyphenyl)-methane, 2,2-bis-(4'-hydroxy-3'-dimethylphenyl)-propane, 1,1-or 2,2- or 2,2-bis-(p-hydroxyphenyl)-butane, 1,1-dichloro- or 1,1,1-trichloro-2,2-bis-(p-hydroxyphenyl)-ethane, 1,1-bis-(p-hydroxyphenyl)-cyclopentane, and in particular 2,2-bis-(p-hydroxyphenyl)-propane (bisphenol-A) and 1,1-bis-(p-hydroxyphenyl)-cyclohexane (bisphenol-C).

Suitable polyesters of hydroxycarboxylic acids are for example polycaprolactone, polypivalolactone or the polyesters of 4-hydroxycyclohexanecarboxylic acid or 4-hydroxybenzoic acid.

Polyesters with aromatic dicarboxylic acids have acquired the greatest importance, especially polyalkyleneterephthalate. Thus preferred moulding compositions according to the invention are those in which the polyester is formed from at least 30 mol %, preferably from at least 40 mol %, of an aromatic dicarboxylic acid and at least 30 mol %, preferably at least 40 mol %, of an alkylenediol having preferably 2 to 12 C atoms, relative to the polyester.

The alkylenediol in this case is in particular straight-chain and contains 2 to 6 C atoms, for example ethylene glycol or tri-, tetra- or hexamethylene glycol, and the aromatic dicarboxylic acid is terephthalic and/or isophthalic acid. Especially preferred polyesters are polyethylene- and poly-1,4-butyleneterephthalete, as well as copolyesters based on polyethylene- and poly-1,4-butyleneterephthalate.

The moulding composition according to the invention can additionally contain 5–55% by weight of a filler and/or of a reinforcing (fibrous) filler, for example asbestos fibres, carbon fibres or particularly glass fibres. The total amount of fillers and calcium phosphate is at most 60% by weight, relative to the total mixture. The fillers, including calcium phosphate, can be coated with an adhesion promoter in order to improve the bonding of the fillers to the polyester.

The moulding compound according to the invention can additionally contain also 3 to 30% by weight, preferably 8 to 20% by weight, relative to the polyester, of a fire-retarding additive. Suitable fire-retarding additives are for example: organic halogen compounds, especially chlorine or bromine compounds, which are used on their own, or together with synergistically acting compounds having elements of the fifth main group of the periodic system, particularly phosphorus and antimony compounds, especially antimony trioxide.

Fire-retarding agents based on organic chlorine- and/or particularly bromine-containing compounds are known. They can be those which are incorporated as mixture components into the plastics material, or those which are incorporated as reactive monomers into the polymer molecules. Examples of the last-mentioned are tetrachlorophthalic acid anhydride, dichloroterephthalic acid or lower alkyl esters thereof, tetrabromophthalic acid anhydride, tetrabromobisphenol-A or N,N'-bis-(β-hydroxyethyl)-tetrachloro- or -tetrabromobenzimidazolone.

Further examples of chlorine- and/or bromine-containing compounds are: polytribromostyrene, polypentabromostyrene, decabromodiphenyl, tetrabromodiphenyl, hexabromodiphenyl ether, octabromodiphenyl ether, decabromodiphenyl ether, tetrabromodiphenyl sulfide, hexabromodiphenyl sulfone, 3-(2',4',6'-tribromophenoxy)-1,2-propanediol, di- or tetrabromophthalic acid or anhydrides thereof, dibromoterephthalic acid, hydroxyl-ethylated di- or tetrabromobisphenol-A, tetrabromo-1,4-(dihydroxymethyl)-benzene, tetrabromobenzimidazolone and N,N'-alkylene-bis-tetrabromophthalimide, as well as the chlorine-analogous compounds. Further organic halogen compounds are described for example in the German Offenlegungsschrift No. 2,242,450.

The amount of calcium phosphate in the moulding composition according to the invention can be 0.01 to 40% by weight, preferably 0.1 to 30% by weight, relative to the polymer. The amount added to improve the tracking resistance is in general 0.3 to 40% by weight, while to reduce the corrosiveness an amount of 0.01 to 4% by weight can be sufficient.

The calcium phosphate used according to the invention is a finely-divided and substantially water-free phosphate. The phosphate therefore is if necessary to be dried before being added. The particle size of the phosphate can be for example 0.1 to 100 μm, preferably 1 to 50μ. The calcium phosphates can be hydrogen phosphate, phosphate, hydroxide apatite, halide apatite, especially fluoride or chloride apatite, a metaphosphate, a polyphosphate or an ultraphosphate, and mixtures of phosphates. Examples are: $CaHPO_4$, $Ca_3(PO_4)_2$, $Ca_5(PO_4)_3(OH)$, $Ca_5(PO_4)_3(F,Cl)$, $Ca_2P_2O_7$, $Ca_3(P_3O_9)_2$, $Ca_2(P_4O_{12})$, $Ca_5(P_3O_{10})_2$ and calcium polyphosphate. Those preferred are: $CaHPO_4$, $Ca_3(PO_4)_2$, $Ca_5(PO_4)_3(OH)$ and $Ca_5(PO_4)_3(F,Cl)$.

The thermoplastic polymers are known and commercially available, or they can be produced by known polymerisation processes customary in industry.

The composition according to the invention is produced likewise using methods commonly known in industry, by incorporation of the additives into the thermoplastic polymer, during or after polymerisation, by addition to the reaction mixture or by regranulation.

Further customary additives can also be added, for example other fillers, such as talcum, mica, metal powder, silicic acid aerosol, kaolin, calcium carbonate, dolomite, silicates or glass balls, inorganic or organic pigments, optical brighteners, delustering agents, internal lubricants, mould release agents, agent promoting crystallisation, antioxidants, light stabilisers and processing stabilisers.

The moulding composition according to the invention has improved tracking resistance, which is particularly favourable in the case of reinforced and/or noninflammable-rendered moulding compositions. In moulding compositions which have been rendered noninflammable, the corrosiveness on contact metals is moreover reduced, and the fire-retarding effect is improved to the extent that dripping during burning is reduced.

The moulding compositions can be processed by customary shaping processes, such as casting, moulding, injection moulding and extruding, into consumer articles of all kinds. Examples of these are: technical apparatus parts, apparatus housings, domestic equipment, sports appliances, electric insulation, automobile components, switch gear, sheets, films, and semi-products which can be shaped by machining. By virtue of the good electrical properties of the moulding compositions, a particular field of application is the production of shaped products for the electrical, electronics and domestic appliance industries.

The following Examples further illustrate the invention.

EXAMPLE 1

10% by weight of $Ca_5(PO_4)_3(OH)$ are incorporated at 250° C., by means of a laboratory Ko-kneader, into 90% by weight of polybutylene terephthalate (PBTP) having a viscosity number according to DIN 53728/3 of 147 cm³/g, and the moulding composition is then granulated. The mean particle size of the employed calcium phosphate is about 3 μm. The granulate is firstly dried and is subsequently processed into the form of specimens (sheets 120×80×4 mm) under the following conditions: cylinder temperature 250° C., tool temperature 80° C., cycle time 45 seconds. The tracking-resistance values given in the following Table are determined on the specimens according to DIN 53480, processes KB and KC.

The tracking resistance, measured according to the KB process, is improved compared with that of PBTP.

EXAMPLE 2

10% by weight of $Ca_5(PO_4)_3(OH)$ are incorporated, in a manner analogous to that described in Example 1, into 90% by weight of polybutylene terephthalate (viscosity number according to DIN 53728/3: 135 cm$^3$/g), which contains as fire-retarding agent 10% by weight of decabromodiphenyl oxide and 5% by weight of $Sb_2O_3$; and the moulding composition is subsequently injection moulded into specimens.

EXAMPLE 3

In a manner analogous to that given in the preceding Examples, there are incorporated into 75% by weight of PBTP (viscosity number 110 cm$^3$/g), with the aid of a laboratory Ko-kneader, 5% by weight of $Ca_5(PO_4)_3(OH)$ and 20% by weight of glass fibres; and, after granulation and drying, specimens are produced from the moulding composition.

The tracking-resistance values are given in the following Table. The tracking resistance compared with that of PBTP reinforced with glass fibres is considerably improved.

EXAMPLES 4–6

Using a laboratory Ko-kneader in a manner analogous to that in the preceding Examples, there are added in each case to 80% by weight of a PBTP moulding composition consisting of 56.5% by weight of PBTP (viscosity number 100 cm$^3$/g), 9% by weight of decabromodiphenyl oxide, 4.5% by weight of $Sb_2O_3$ and 30% by weight of glass fibres, 20% by weight of each of the following calcium phosphates:

Example 4: 20% by weight of $Ca_5(PO_4)_3(OH)$,
Example 5: 20% by weight of $Ca_3(PO_4)_2$, and
Example 6: 20% by weight of $CaHPO_4$.

The granulated moulding composition is dried and then processed into specimens as in the preceding Examples. The tracking resistance values given in the following Table are considerably higher than those for moulding compositions without a phosphate addition.

In addition, the combustibility is determined according to UL-94 on specimens (having dimensions of 127×12.7×1.6 mm) from Examples 4 and 6. The specimens are produced by injection moulding likewise under the processing conditions given in Example 1.

According to the UL-94 test, the specimens give values corresponding to the following combustibility classes:

Example 4: class V-O, non-dripping
Example 6: class V-O, non-dripping.

In the case of a moulding composition without the addition of phosphate, the drops falling down are capable of igniting cotton wool.

TABLE

| Example No. | Composition | Tracking resistance DIN 53480 | |
|---|---|---|---|
| | | Process KB | Process KC |
| 1 | 90% by wt. of PBTP 10% by wt. of $Ca_5(PO_4)_3(OH)$ | >600 | >600 |
| 2 | 90% by wt. of PBTP with 10% by wt. of decabromodiphenyl oxide and 5% by wt. of $Sb_2O_3$, relative to the polymer, and 10% by wt. of $Ca_5(PO_4)_3(OH)$ | 400 | 600 |
| 3 | 75% by wt. of PBTP 5% by wt. of $Ca_5(PO_4)_3(OH)$ | | >600 |
| 4 | 20% by wt. of glass fibres 80% by wt. of PBTP, reinforced, fire-retarded* 20% by wt. of $Ca_5(PO_4)_3(OH)$ | | 525 |
| 5 | 80% by wt. of PBTP, reinforced, fire-retarded* 20% by wt. of $Ca_3(PO_4)_2$ | | 525 |
| 6 | 80% by wt. of PBTP, reinforced, flame-retarded* 20% by wt. of $CaHPO_4$ | | 475 |

*56.5% by weight of PBTP, 9% by weight of decabromodiphenyl oxide, 4.5% by weight of $Sb_2O_3$ and 30% by weight of glass fibres.

EXAMPLE 7

Into a glass container of 1 liter capacity are placed in each case 25 standard small test bars (6×4×50 mm) prepared from moulding compositions as described below, along with one platelet of silver-plated brass and one of tin bronze, and the container is stored at 170° C. for 15 days in a heating chamber:

50.5% by weight of PBTP (viscosity number 82 cm$^3$/g),
12.5% by weight of polytribromostyrene,
5.0% by weight of $Sb_2O_3$,
2.0% by weight of $Ca_3(PO_4)_2$, and
30.0% by weight of glass fibres.

The glass container is closed during the test and the two metal platelets are suspended above the plastics specimens.

The metal platelets retain their metallic lustre without visible corrosion, whereas in the case of corresponding moulding compositions without the phosphate addition a grey to black coating is formed.

EXAMPLE 8

In the same manner as in Example 7, the corrosion effect of standard small test bars formed from a moulding composition containing the following constituents:

91.7% by weight of a PBTP-copolymer having 7 mol %* of 1,3-bis-(2-hydroxyethyl)-4,5,6,7-tetrabromobenzimidazolonediol as co-component

*relative to dimethyl terephthalate, 8.0% by weight of $Sb_2O_3$, and
0.3% by weight of $Ca_5(PO_4)_3(OH)$, is determined.

No corrosion effect is observed, whereas specimens containing no phosphate cause a clearly visible discolouration of the metal platelets.

What is claimed is:

1. A moulding composition for casting, moulding or injection moulding, having improved tracking resistance which comprises
    (a) 99.7 to 60% by weight of a thermoplastic polyester, and
    (b) 0.3 to 40% by weight of a substantially water-free calcium phosphate.

2. A moulding composition according to claim 1, wherein the polyester is a straight-chain polyester.

3. A moulding composition according to claim 2, wherein the polyester is a polyethylene terephthalate or a poly-1,4-butylene terephthalate, or a copolyester based on polyethylene terephthalate or poly-1,4-butylene terephthalate.

4. A moulding composition according to claim 2 wherein the polyester is a polyalkylene terephthalate.

5. A moulding composition according to claim 1, which additionally contains 3 to 30% by weight, relative to the polymer, of a fire-retarding additive.

6. A moulding composition according to claim 1, which contains, besides a fire-retarding additive, 5 to 55% by weight, relative to the polymer, of a filler or reinforcing filler or mixture thereof, the total amount of calcium phosphate and fillers being not more than 60% by weight, relative to the total mixture.

7. A moulding composition according to claim 1, wherein the calcium phosphate is a hydrogen phosphate, phosphate, hydroxide apatite or halide apatite, a metaphosphate, a polyphosphate or an ultraphosphate.

8. A moulding composition according to claim 7, wherein the calcium phosphate is $CaHPO_4$, $Ca_3(PO_4)_2$, $Ca_5(PO_4)_3(OH)$ or $Ca_5(PO_4)_3(F,Cl)$.

9. A process for improving the tracking resistance of thermoplastic polyesters, and for reducing the corrosiveness of thermoplastic polyesters which have been rendered noninflammable, which process comprises incorporating into the polyester 0.3 to 40% by weight of a substantially water-free calcium phosphate.

* * * * *